May 29, 1924.
C. E. REDDIG
1,494,629
AUTOMATIC POWER AND LIGHT SYSTEM
Filed Nov. 26, 1921
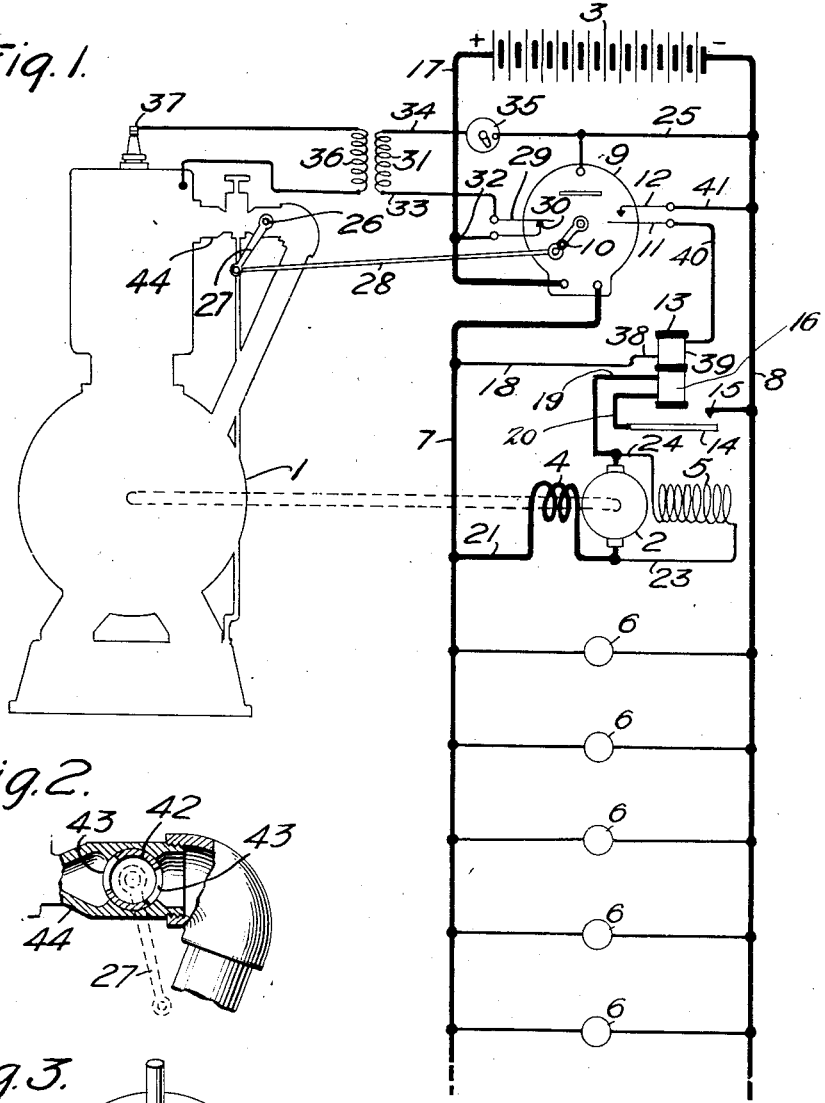
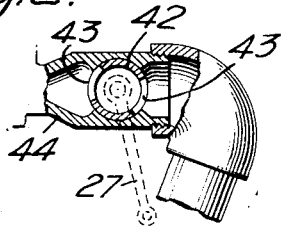
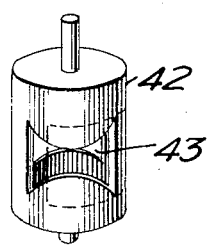
Inventor:
Charles E. Reddig
by [signature]
Atty.

Patented May 20, 1924.

1,494,629

UNITED STATES PATENT OFFICE.

CHARLES E. REDDIG, OF KEW GARDENS, NEW YORK, ASSIGNOR TO WESTERN ELECTRIC COMPANY, INCORPORATED, OF NEW YORK, N. Y., A CORPORATION OF NEW YORK.

AUTOMATIC POWER AND LIGHT SYSTEM.

Application filed November 26, 1921. Serial No. 517,917.

*To all whom it may concern:*

Be it known that I, CHARLES E. REDDIG, a citizen of the United States, residing at Kew Gardens, in the county of Queens, State of New York, have invented certain new and useful Improvements in Automatic Power and Light Systems, of which the following is a full, clear, concise, and exact description.

This invention relates to automatic power and light systems and has particular reference to improvements in the control features of such systems.

The primary object of the invention is to provide means which shall be responsive to the total energy output of a prime mover for a given period of its operation and which shall control the rate of said energy output inversely to the total amount thereof from the beginning of such given period.

A further object of the invention is to so construct a control mechanism for a prime mover that its starting, stopping and its speed of operation may be jointly controlled by a single device, thus cutting down the number of elements necessary for the operation of an automatic power and light set.

More specifically, this invention relates to an energy responsive control adapted for use in systems in which a tapered energy output is desirable, as, for example, a battery charging system where the battery is to be given a tapered charge in order to prolong its life. The control comprises, for instance, a watt hour meter which is responsive to currents flowing in either direction and which is placed in circuit with a dynamo and a battery, the dynamo being adapted to operate as a motor to start a prime mover, (such as an internal combustion engine) and later as a generator to charge the battery. The indicating arm of the watt hour meter has a link connection with the throttle of the internal combustion engine whereby the throttle is opened or closed with the movement of the arm, and the speed of the engine controlled. The watt hour meter has a time of operation which approximates the period of time required to charge the storage battery and will either close a circuit to energize the dynamo for starting the internal combustion engine after a predetermined amount of energy has passed from the battery to a load circuit, or open an ignition circuit to stop the internal combustion engine when the required amount of energy has passed from the dynamo to the battery in charging the same. The arm of the watt hour meter, in passing in a clockwise direction through a 180 degree arc between its starting and its stopping position, gradually closes the throttle of the internal combustion engine, cutting down its speed in inverse relation to the total amount of electrical energy which has passed from the charging generator to the battery from the beginning of the charging period. In this manner, a tapering charge is given to the battery and injurious rapid charging is prevented.

During the period of battery discharge on the other hand, the arm of the watt hour meter rotates counterclockwise in response to the energy discharged by the battery until sufficient energy has been expended to bring the watt hour meter arm back through the 180 degree arc to the position in which it closes the starting switch, thereby initiating a new charging operation.

The invention, however, is not limited to the use of a watt hour meter inasmuch as any device, such as a time clock, having a movable arm and a time of operation approximating the time of battery charging will operate in substantially the same manner.

In the accompanying drawing, Fig. 1 is a schematic illustration of an automatic power and light set employing an internal combustion engine, as the prime mover, provided with a watt hour meter control.

Fig. 2 is a detail view illustrating another form of throttle valve which may be employed with the set shown in Fig. 1 when a different regulating characteristic is desired.

Fig. 3 is a detail perspective view of the valve structure shown in Fig. 2.

Referring to the drawing in detail, an internal combustion engine 1 which serves as a prime mover is mechanically connected to a dynamo electric machine 2, for the purpose of actuating the same to charge an accumulator 3 and when necessary to be actuated thereby to start the operation of the charging system. Dynamo electric machine 2, which is provided with a series winding 4 and a shunt winding 5, energizes a series of translating devices 6 and a battery charging circuit through conductors 7 and 8. The accumulator 3 is adapted to energize the translating devices 6 when the dynamo 2 is operative, and in addition, to energize the dynamo 2 as a starting motor when the condition of the battery is such that it becomes necessary to start the internal combustion engine 1 to charge the accumulator 3.

A watt hour meter 9 interposed in the circuit between the dynamo electric machine 2 and the accumulator 3, and having a series coil (not shown) which is responsive to all current flowing in either direction through main conductors 7 and 8, and a shunt coil (not shown) which is connected across conductors 7 and 8 and is responsive to the potential difference of these mains at all times, is provided with an arm 10 which operates in clockwise, or in counter-clockwise direction according as the dynamo electric machine 2 is charging the accumulator 3 or the accumulator 3 is discharging through translating devices or load circuit 6.

After the accumulator has discharged a definite proportion or amount of its energy, the arm 10 of the watt hour meter 9 which has been rotating in a counter-clockwise direction in response to the accumulator discharge, engages a spring retracted contact arm 11, forcing it into engagement with a contact 12 thereby momentarily energizing a motor starting relay 13, over a circuit which may be traced from positive pole of accumulator 3, conductor 17, watt hour meter 9, conductors 7, 18, 38, coil 39 of relay 13, conductor 40, spring retracted contact 11, contact 12, conductors 41, 8, to negative pole of accumulator 3. Relay 13 thus energized, moves its armature 14 into engagement with a contact 15 closing the circuit from the accumulator 3 through the dynamo electric machine 2, which may be traced from positive pole of accumulator 3, conductor 17, watt hour meter 9, conductors 7, 21, series field 4, armature of dynamo electric machine 2, conductor 19, relay winding 16, armature 14, contact 15, conductor 8 to negative pole of accumulator 3. The shunt field 5 of dynamo electric machine 2 is at this time energized from positive pole of accumulator 3, conductor 17, watt hour meter 9, conductors 7, 21, series field 4, conductor 23, shunt field 5, conductors 24, 19, armature 14, contact 15, and conductor 8 to negative pole of accumulator 3. Coils 16 and 39 of relay 13 both continue to be energized so long as contact 11 is in engagement with contact 12 and current is flowing from accumulator 3 through the dynamo electric machine 2 to energize the same as a starting motor. When the prime mover 1 has been started, however, and dynamo electric machine 2 is being driven as a generator, charging current flows from machine 2 into accumulator 3, through watt hour meter 9, in a reverse direction. Arm 10 of watt hour meter 9 begins to move in a clockwise direction disengaging from contact 11 and allowing coil 39 of relay 13 to become deenergized. The deenergization of coil 39 has no effect on the operation of relay 13, however, and therefore no effect on the operation of the rest of the system, since the locking coil 16, which has sufficient ampere turns to hold armature 14, is now energized in series with dynamo electric machine 2. Coil 16 will continue to be energized until the close of the charging period at which time it will become deenergized, in a manner hereinafter described, to disconnect dynamo electric machine 2 from accumulator 3 thereby putting the system in condition for subsequent charging operations.

Arm 10 of watt hour meter 9 is directly connected to butterfly valve throttle 26 of the carbureter, of internal combustion engine 1, by a link connection which comprises a lever arm 27 and a thrust rod 28. In its clockwise motion, which commences with the charging operation after the system has been started, arm 10 gradually turns throttle 26 from its wide open position to a closed position thereby slowly reducing the speed of prime mover 1 during the charging operation. By means of this link connection, prime mover 1 drives dynamo electric machine 2 at a variable rate of speed so that it generates a variable charging current which enters accumulator 3 in large amounts for a fraction of the charging operation, which is rapidly reduced in value for another fraction of the charging period and is finally reduced gradually for the closing fraction of the charging period so that current is accumulated in small amounts by the almost charged accumulator 3 for a time sufficient to give it a slight beneficial overcharge. With the butterfly valve connection, as shown in Fig. 1, the value of the charging current obtained from dynamo electric machine 2 may be graphically represented by a curve having a series of successive steps or slopes.

A cylindrical valve 42 (Figs. 2 and 3) may be substituted for butterfly valve 26, in order to secure a more uniform effect for the motion of arm 10 of watt hour meter 9 which, as may be readily noted from Fig. 1, translates most of its rotary motion into a horizontal component of force when its arm 10 rotates through the more vertical positions in its travel and translates very little of that rotary motion into horizontal force in its operation through the more horizontal positions. By shaping the outlets 43 of the cylindrical valve 42 as is indicated in Fig. 3 and by permitting this outlet to gradually register, during the operation of valve 42, with the intake manifold 44 whose cross section is shown in dotted lines on Fig. 3, the engine operation may be controlled as desired. The effect of the movement of arm 10 may thus be regulated by adjusting cylindrical throttle 26 to secure uniform closing thereof as the watt hour meter arm 10 revolves. With the cylindrical valve orifice, shaped as shown in Fig. 3, the value of the charging current can be graphically represented by a straight line curve.

The particular conditions, of each individual case, for which the system is to be used, and the charging curve desired, will, in each instance determine what kind of a valve is to be used and the manner in which it should be connected to the time element or watt hour meter 9.

Stopping of the charging system is likewise accomplished by arm 10 which rotates during the charging operation in a clockwise direction through an angle of 180° and thereupon engages a spring retracted contact 29, momentarily forcing it out of engagement with a contact 30, thereby opening the circuit of a primary winding 31 of an ignition circuit for the internal combustion engine 1. The ignition circuit includes the usual primary coil 31 and secondary coil 36. The circuit of the primary 31 is constantly energized, except for the momentary interruption for stopping the prime mover over a circuit extending from positive pole of accumulator 3, conductors 17, 32, contact 30, spring retracted contact 29, conductor 33, primary winding 31, conductor 34, timer 35 and conductors 25 and 8 to negative pole of the accumulator 3. The operation of winding 31 as a primary coil will not depend entirely upon the opening and closing of spring retracted armature 29 and contact 30, but will be dependent upon the functioning of the timer 35 which operates to make and break the primary circuit when driven by the internal combustion engine 1. Cooperating with primary winding 31 is a secondary winding 36 which furnishes induced voltage to a spark plug 37 during the operation of the prime mover 1 and which is deenergized to stop the prime mover as a result of the momentary engagement of arm 10 with spring retracted armature 29, described above. Upon the engagement of arm 10 with spring 29, an electrical equilibrium will be established in the charging circuit so that with no current delivered to the mains, retaining coil 16 of starting relay 13 will permit its armature 14 to drop back in readiness for subsequent charging operations.

If, however, when the accumulator 3 is being charged, any translating devices 6 are in circuit with the accumulator 3 and the dynamo electric machine 2, the watt hour meter will not stop the operation of the prime mover, but will allow the same to continue to drive machine 2 to energize said devices while the accumulator 3 floats on the line. The actual charging of the battery, however, is time controlled.

Upon completion of the charging operation and the stopping of internal combustion engine 1, battery current will flow through the load circuit from accumulator 3, conductor 17 and through watt hour meter 9 in a direction opposite from that in which it flowed during the charging operation, thence through conductor 7, translating devices 6, conductor 8, back to negative pole of accumulator 3. Arm 10 of watt hour meter 9, accordingly begins to move in a counter-clockwise direction, responsive to the energy output of the accumulator 3, until accumulator 3 has become discharged to a point where further charging is necessary. By this time, arm 10 will have rotated into engagement with spring retracted armature 11, will have brought the same into engagement with contact 12, and a repetition of the charging operation will result.

The starting, stopping and speed of operation of an automatic power and light set are thus jointly controlled by a single composite element which eliminates the necessity for a plurality of starting and stopping relays as well as other devices normally employed to control the operation of automatic power and light systems.

What is claimed is:

1. In combination a prime mover, means for receiving energy developed by said prime mover, and means for gradually regulating the speed of said prime mover in response to the cumulatively measured energy supplied to said receiving means.

2. In combination an electric generator, means for actuating said generator, means for receiving output from said generator, and means for regulating the speed of said generator in response to the cumulatively measured output of said generator received by said receiving means.

3. In a power and light set, a prime mover, and energy responsive means for starting and stopping said set, said means serving to gradually regulate the speed of said prime mover.

4. In a prime mover battery charging system, a device for gradually regulating the speed of the prime mover in response to the cumulatively measured charge supplied to the battery.

5. Means for charging an accumulator comprising a prime mover, a dynamo electric machine, and means for decreasing the output of said dynamo electric machine as the cumulatively measured charge supplied to said accumulator increases.

6. In an automatic power and light set, an accumulator, a source of electrical energy, means for actuating said source of electrical energy, and a device for regulating the output of said source of electrical energy in response to the cumulatively measured charge delivered to said accumulator.

7. In a system for charging storage batteries, a source of electrical energy connected to the battery to be charged, actuating means for said source, means responsive to the cumulatively measured charge delivered to said battery, means for regulating the speed of said actuating means, and a link connection between said means responsive to the charge and said regulating means for causing adjustment of said regulating means in response to the charge delivered to said battery.

8. In a power and light system; an internal combustion engine; a dynamo electric machine; a storage battery; means for causing said dynamo electric machine to operate as a motor to start said internal combustion engine and to operate as a generator to charge said battery; means responsive to the cumulatively measured charge delivered to said battery to suspend the operation of said internal combustion engine when the charge of the battery reaches a predetermined amount, and to control the speed of the engine during the charging of the battery.

9. In a power and light set, an internal combustion engine, having a throttle, a dynamo electric machine mechanically connected to said engine, an accumulator adapted to be electrically connected to said dynamo electric machine to energize the same for starting said internal combustion engine and to be charged by said dynamo electric machine when the said internal combustion engine has been started, an ignition circuit for said internal combustion engine, a meter having means for closing a circuit from said accumulator to said dynamo electric machine to energize the same after said accumulator has been discharged a predetermined amount, means for opening said ignition circuit after a predetermined charge has passed from said dynamo electric machine to said accumulator, means for locking the circuit including the dynamo electric machine and the accumulator, and a link connection from said meter to said internal combustion engine to decrease the speed of said engine as the cumulatively measured charge of said accumulator increases.

10. In combination, an electric generator, means for actuating said generator, means for receiving output from said generator, and means for controlling the output of said generator in response to the cumulatively measured output received by said receiving means.

In witness whereof, I hereunto subscribe my name this 16th day of November A. D., 1921.

CHARLES E. REDDIG.